(12) United States Patent
Rawle et al.

(10) Patent No.: US 7,548,068 B2
(45) Date of Patent: Jun. 16, 2009

(54) SYSTEM FOR TESTING PROPERTIES OF A NETWORK

(75) Inventors: Michael Rawle, Springville, UT (US); David B. Bartholomew, Springville, UT (US); Marshall A. Soares, Taylorsville, UT (US)

(73) Assignee: IntelliServ International Holding, Ltd. (KY)

( * ) Notice: Subject to any disclaimer, the term of this patent is extended or adjusted under 35 U.S.C. 154(b) by 452 days.

(21) Appl. No.: 10/904,799

(22) Filed: Nov. 30, 2004

(65) Prior Publication Data

US 2006/0145889 A1    Jul. 6, 2006

(51) Int. Cl.
GO1R 31/11     (2006.01)
GO1R 27/04     (2006.01)
GO1R 27/32     (2006.01)

(52) U.S. Cl. .................................. 324/534; 324/642
(58) Field of Classification Search ............... 324/534, 324/642
See application file for complete search history.

(56) References Cited

U.S. PATENT DOCUMENTS

| | | | |
|---|---|---|---|
| 2,414,719 A | 1/1947 | Cloud | |
| 3,518,608 A | 6/1970 | Papedopouloe | |
| 3,978,282 A | 8/1976 | Fulton, Jr. | |
| 4,297,880 A | 11/1981 | Berger | |
| 4,739,325 A | 4/1988 | MacLeod | |
| 4,788,544 A | 11/1988 | Howard | |
| 5,307,284 A | 4/1994 | Brunfeldt et al. | |
| 5,887,657 A | 3/1999 | Bussear et al. | |
| 5,934,371 A | 8/1999 | Bussear et al. | |
| 6,012,015 A | 1/2000 | Tubel | |
| 6,230,557 B1 | 5/2001 | Ciglenec et al. | |
| 6,252,518 B1 * | 6/2001 | Laborde | 340/855.4 |
| 6,392,317 B1 | 5/2002 | Hall et al. | |
| 6,415,231 B1 | 7/2002 | Hebert | |
| 6,415,877 B1 | 7/2002 | Fincher et al. | |
| 6,648,081 B2 | 11/2003 | Fincher et al. | |
| 6,659,197 B2 | 12/2003 | Cooper | |
| 6,670,880 B1 | 12/2003 | Hall et al. | |
| 6,688,396 B2 | 2/2004 | Floerke et al. | |
| 6,717,501 B2 | 4/2004 | Hall et al. | |
| 6,799,632 B2 | 10/2004 | Hall et al. | |
| 6,821,147 B1 | 11/2004 | Hall et al. | |

(Continued)

OTHER PUBLICATIONS

PCT/US03/16475, Published Dec. 4, 2003, Applicant Baker Hughes; International Search Report: "Documents Considered to be Relevant".

*Primary Examiner*—Amy He
(74) *Attorney, Agent, or Firm*—Victor Segura

(57) ABSTRACT

A method for identifying properties of a downhole electromagnetic network in a downhole tool sting, including the step of providing an electromagnetic path intermediate a first location and a second location on the electromagnetic network. The method further includes the step of providing a receiver at the second location. The receiver includes a known reference. The analog signal includes a set amplitude, a set range of frequencies, and a set rate of change between the frequencies. The method further includes the steps of sending the analog signal, and passively modifying the signal. The analog signal is sent from the first location through the electromagnetic path, and the signal is modified by the properties of the electromagnetic path. The method further includes the step of receiving a modified signal at the second location and comparing the known reference to the modified signal.

13 Claims, 5 Drawing Sheets

U.S. PATENT DOCUMENTS

| | | |
|---|---|---|
| 6,830,467 B2 | 12/2004 | Hall et al. |
| 6,844,498 B2 | 1/2005 | Hall et al. |
| 6,854,532 B2 | 2/2005 | Fincher et al. |
| 6,866,306 B2 | 3/2005 | Boyle et al. |
| 6,888,473 B1 | 5/2005 | Hall et al. |
| 6,896,075 B2 | 5/2005 | Haugen et al. |
| 6,913,093 B2 | 7/2005 | Hall et al. |
| 6,929,493 B2 | 8/2005 | Hall et al. |
| 6,945,802 B2 | 9/2005 | Hall et al. |
| 6,950,034 B2 * | 9/2005 | Pacault et al. ............ 340/855.2 |
| 6,968,611 B2 | 11/2005 | Hall et al. |
| 6,986,282 B2 | 1/2006 | Ciglenec et al. |
| 7,040,415 B2 * | 5/2006 | Boyle et al. .................... 175/40 |
| 7,044,237 B2 | 5/2006 | Leuchtenberg |
| 7,062,959 B2 | 6/2006 | Kurkjian et al. |
| 7,082,821 B2 | 8/2006 | Chen et al. |
| 7,096,975 B2 | 8/2006 | Aronstam et al. |
| 7,098,767 B2 * | 8/2006 | Hall et al. ................... 336/234 |
| 7,114,581 B2 | 10/2006 | Aronstam et al. |
| 7,172,037 B2 | 2/2007 | Dashevskiy et al. |
| 7,174,975 B2 | 2/2007 | Krueger et al. |
| 7,178,608 B2 | 2/2007 | Mayes et al. |
| 7,201,221 B2 | 4/2007 | Tubel et al. |
| 7,270,185 B2 | 9/2007 | Fontana et al. |
| 7,284,903 B2 | 10/2007 | Hartog |
| 7,311,142 B2 | 12/2007 | Fisseler et al. |
| 7,353,887 B2 | 4/2008 | Krueger et al. |
| 2002/0112888 A1 | 8/2002 | Leuchtenberg |
| 2003/0066359 A1 | 4/2003 | Gysling et al. |
| 2004/0025583 A1 | 2/2004 | Kurkjian et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001738 A1 | 1/2005 | Hall et al. |
| 2005/0024231 A1 | 2/2005 | Fincher et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092488 A1 | 5/2005 | Rodet et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0194184 A1 | 9/2005 | Gleitman |
| 2005/0194185 A1 | 9/2005 | Gleitman |
| 2005/0200498 A1 | 9/2005 | Gleitman |
| 2005/0212530 A1 | 9/2005 | Hall et al. |
| 2005/0236160 A1 | 10/2005 | Hall et al. |
| 2005/0279508 A1 | 12/2005 | Hall et al. |
| 2005/0284659 A1 | 12/2005 | Hall et al. |
| 2005/0284662 A1 | 12/2005 | Hall et al. |
| 2005/0284663 A1 | 12/2005 | Hall et al. |
| 2005/0285645 A1 | 12/2005 | Hall et al. |
| 2005/0285705 A1 | 12/2005 | Hall et al. |
| 2005/0285706 A1 | 12/2005 | Hall et al. |
| 2005/0285751 A1 | 12/2005 | Hall et al. |
| 2005/0285752 A1 | 12/2005 | Hall et al. |
| 2005/0285754 A1 | 12/2005 | Hall et al. |
| 2006/0157282 A1 | 7/2006 | Tilton et al. |
| 2007/0007041 A1 | 1/2007 | Krueger et al. |
| 2007/0039730 A1 | 2/2007 | Fisseler et al. |
| 2007/0045006 A1 | 3/2007 | Krueger et al. |
| 2007/0263488 A1 | 11/2007 | Clark |
| 2007/0272033 A9 | 11/2007 | Jones |
| 2008/0060846 A1 | 3/2008 | Belcher et al. |

* cited by examiner

US 7,548,068 B2

SYSTEM FOR TESTING PROPERTIES OF A NETWORK

FEDERAL SPONSORSHIP

This invention was made with government support under Contract No. DE-FC26-01NT41229 awarded by the U.S. Department of Energy. The government has certain rights in the invention.

BACKGROUND OF THE INVENTION

The present invention relates to the field of system analysis and diagnostics, particularly in a downhole network along a drill string used in oil and gas exploration, or along the casings and other equipment used in oil and gas production.

Many downhole systems have been developed which transmit data from one point to another, and the properties of the network may influence the performance of the system. Therefore, it may be useful to have tools that can test the properties of a network. Several apparatuses and methods have been developed to analyze the properties of a network.

U.S. Pat. No. 3,978,282 discloses an apparatus and method for measuring the characteristics of a network in which a substantially non-interfering, low-intensity sweeping test signal is transmitted along a network to be tested. A reference signal is transmitted along with a test signal for synchronizing the operation of tracking means.

U.S. Pat. No. 5,307,284 discloses a vector network analyzer, which utilizes a single voltage controlled oscillator to produce a sweep frequency over time, which is supplied to a device under test. The return signal from the device under test is delayed and mixed with the original signal to produce an intermediate frequency signal that is digitized and the data manipulated by a computer to measure the reflection coefficient or transmission coefficient of the device under test.

U.S. Pat. No. 4,739,325 discloses an apparatus and method for down-hole EM telemetry while drilling which utilizes a down-hole microprocessor unit and a surface data processing unit (computer) each of which continuously monitors, probes and sweeps the frequency spectrum with EM signals to determine an optimum frequency for signal transmission between the respective units via either the drill string, the surrounding strata, or both U.S. patent application Ser. No. 10/708,775 filed Mar. 24, 2004 in the name of Hall, et al. discloses a method and apparatus for testing electromagnetic connectivity in a drill string. The method comprises transmitting a test signal along a transmission path in a drill string; receiving a reflection of the test signal; and determining from the reflection whether there is an interruption in the electromagnetic connectivity in the transmission path. In general, the apparatus comprises a signal generator for generating a test signal into the drill string; a receiver for receiving the reflection of the test signal; and means for determining from the reflection whether there is an interruption in the electromagnetic connectivity in the transmission path.

BRIEF SUMMARY OF THE INVENTION

A method for identifying properties of a downhole electromagnetic network in a downhole tool string, comprising the step of providing an electromagnetic path intermediate a first location and a second location on the electromagnetic network. The method further comprises the step of providing a receiver at the second location. The receiver is integrated into the electromagnetic network and comprises a known reference. The analog signal comprises a set amplitude, a set range of frequencies, and a set rate of change between the frequencies. The method further comprises the steps of sending the analog signal, and passively modifying the signal. The analog signal is sent from the first location through the electromagnetic path, and the signal is modified by the properties of the electromagnetic path. The method further comprises the step of receiving a modified signal at the second location and comparing the known reference to the modified signal. The differences between the known reference and the modified signal reveal the properties of the electromagnetic path.

The electromagnetic network may comprise inductive couplers. The properties may be frequency response of the network, signal attenuation, or impedance of circuitry along the electromagnetic path of the network. The inductive couplers may affect the impedance of the network or signal attenuation at certain frequencies. Typically, the first location is downhole relative to the second location. Alternatively, the first location may be uphole relative to the second location. The range of frequencies may be between 0 Hz and 10 MHz.

The phrases "uphole relative to" and "downhole relative to" are herein intended to refer to the positioning of one object with respect to another. Generally, something uphole relative to an object is closer to the opening of the well bore than that object. Something downhole relative to an object is farther from the opening of the well bore, or closer to the bottom of the well bore, than that object.

The analog signal may be transmitted by a network node, a repeater, a tool, a drilling assembly, a computer, or surface equipment. The analog signal may be received by a network node, a repeater, a tool, a drilling assembly, a computer, or surface equipment.

The step of comparing the known reference to the modified signal may comprise steps selected from the group consisting of analyzing the spectrum of the modified signal, performing logical computations using the modified signal, and comparing expected values to actual values.

Preferably, the method further comprises the step of sending data representing the modified signal over the electromagnetic network. The known reference may be compared to the modified signal by a facilitator such as a computer, surface equipment, or a network node. Alternatively, the receiver may compare the known reference to the modified signal to reveal the properties of the network Disclosed is a system for testing properties of an electromagnetic network in a segmented downhole tool string which comprises a transmitter and a receiver. The transmitter is in communication with the electromagnetic network and is adapted to transmit a varying analog signal along the network. The receiver is in communication with the electromagnetic network and is adapted to receive the varying analog signal. Differences between the transmitted analog signal and the received signal reveal the properties of the network.

Preferably, the system further comprises a facilitator adapted to receive data representing the transmitted analog signal and facilitate comparing the transmitted analog signal and the received signal to reveal the properties of the network. The facilitator may be a computer, surface equipment, or a network node. Alternatively, the receiver may be adapted to compare the transmitted analog signal and the received signal to reveal the properties of the network. Knowing the proper-

DETAILED DESCRIPTION OF THE INVENTION AND THE PREFERRED EMBODIMENT

Figure 1:
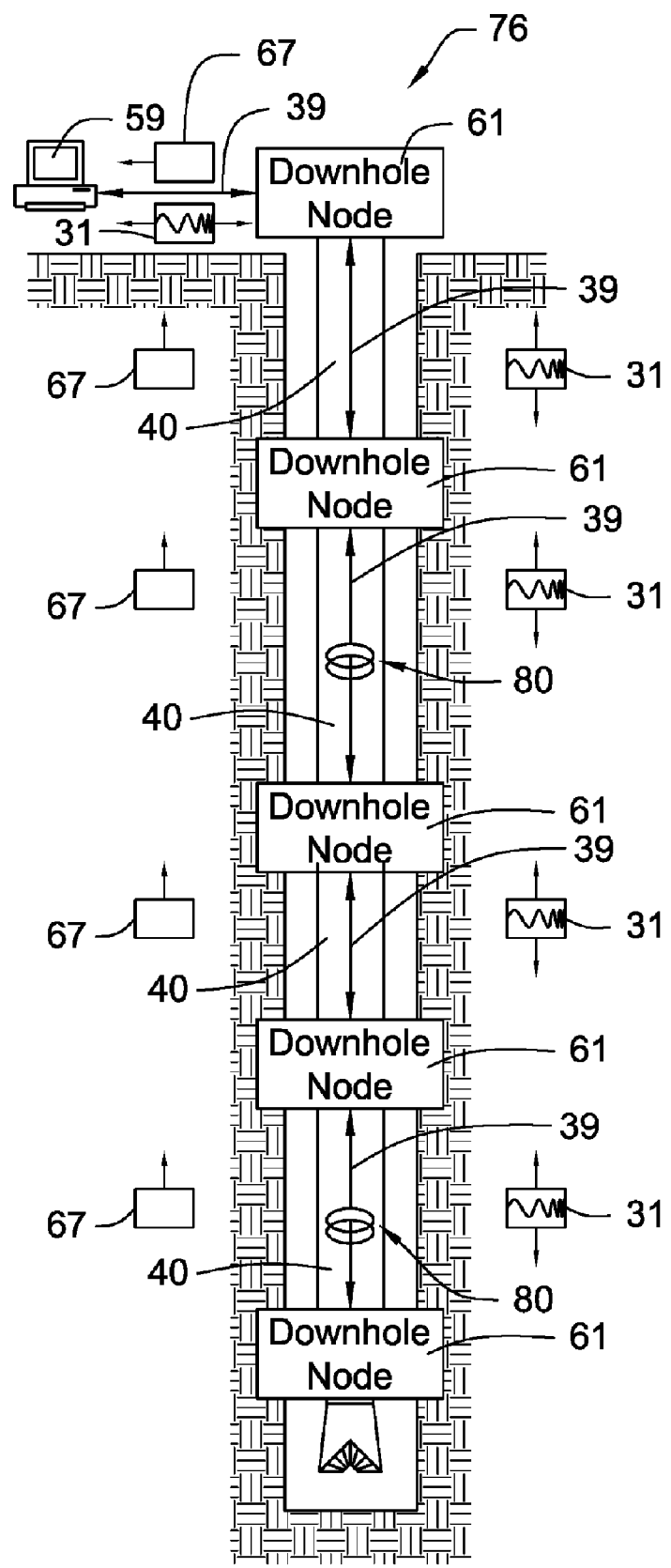
FIG. 1 is a block diagram of a system for testing properties of an electromagnetic network comprising multiple downhole nodes.

FIG. 1 is the preferred embodiment of a system 76 for testing properties of an electromagnetic network 39. The network 39 is integrated into a segmented downhole tool string 40 and an analysis instrument 59 is in communication with the network 39. The analysis instrument 59 may be a computer. Typically, the electromagnetic network 39 comprises inductive couplers 80. The present invention may be able to compute the complex impedance of the inductive couplers 80, and may aide in utilizing the pass band of the network 39 in the most efficient way. A system of inductive couplers tat may be used for transmitting data in a downhole network is disclosed in U.S. Pat. No. 6,670,880 to Hall, et al., entitled "Downhole Data Transmission System," and is herein incorporated by reference. A downhole network which may be tested in accordance with the present invention is disclosed in U.S. Pat. No. 7,139,218 to Hall, et al., entitled "Distributed Downhole Network," and is herein incorporated by reference. Each downhole node 61 may be adapted to transmit a varying analog signal 31 to an adjacent device 61, 59 located uphole relative to the downhole node 61. In general, the varying analog signal 31 may be transmitted directly from one device 61, 59 to another. Data 67 representing the varying analog signal 31 may be sent from each downhole node 61 receiving a varying analog signal 31 to the analysis instrument 59 which may be adapted to facilitate comparing the transmitted analog signal 31 to a received signal 31 to reveal the properties of the network 39. The determinable properties may be frequency response of the network 39, signal attenuation, or impedance of network circuitry. As disclosed in the '218 patent, a downhole node 61 may include various sensors located within the node or interfacing with the node. Sensors may include data gathering devices such as pressure sensors, inclinometers, temperature sensors, thermocouplers, accelerometers, imaging devices, seismic devices, or the like. The sensors may be configured to gather data for transmission up the network to the surface, or may also receive control signals from the surface to control selected parameters of the sensors. The node may provide various functions that are implemented by software, hardware, or a combination thereof. For example, functions of the node may include data gathering, data processing, control, data storage, and other functions. Data may be gathered from sensors located downhole, tools, or other nodes in communication with a selected node. This data may be transmitted or encapsulated within data packets transmitted up and down the network. Data processing may include data amplification or repeating, routing or switching data packets transmitted along the network, error checking of data packets transmitted along the network, filtering of data, as well as other functions, as needed. As disclosed in the '880 patent, with the nodes 61 as data sources, information is available from any node along the drill string, thereby enabling distributed access to information from top to bottom. For instance, instead of relying on a single bottom hole measurement (e.g.. pressure), a downhole parameter profile can now be generated along the entire drill string.

One embodiment of the present invention may be that the analysis instrument 59 sends a varying analog signal 31 to the downhole node 61 closest to the opening of the well-bore over a portion of the network 39. The downhole node 61 may then send data representing the varying analog signal 31 back over that same portion of the network 39 to the analysis instrument 59, and the analysis instrument 59 may then compare the transmitted analog signal 31 to the signal 31 received by the node 61 in order to compute the properties of the portion of the network. Preferably the transmission of the varying analog signal 31 and the data occur at different times, as the varying analog signal 31 may operate over the same range of frequencies as the network 39, and may interfere with the transmission of data.

Another embodiment of the present invention may be that the analysis instrument 59 sends a request for a varying analog signal 31 to an adjacent downhole node 61. The downhole node 61 may then send a varying analog signal 31 to the analysis instrument 59, and the analysis instrument 59 may then receive the varying analog signal 31 and compare the transmitted analog signal 31 to the signal 31 received in order to compute the properties of the network 39. The analysis instrument 59 may have prior knowledge of the varying analog signal 31, which may be compared the signal 31 received.

In general, the response of the network 39 to the varying analog signal 31 is considered to be the frequency response of the network 39. The frequency response of the network 39 may be used to compute the characteristic impedance of the portion of the network 39 under test. The characteristic impedance of the network 39 may be compared to calculated values for the characteristic impedance, and may reveal manufacturer defects or design errors. The characteristic impedance of circuitry may be used to find an area of higher or lower impedance, which may indicate a poor electro-mechanical connection such as a poor pipe joint, which may have higher impedance, or a shorted wire, which may have lower impedance. Signal attenuation may be used to show a passband of certain frequencies, which may be useful in computing what frequencies are best used for the network 39. Knowledge of the pass band may also be used to determine what circuitry is needed to change the pass band, either to shift the range of frequencies passed by the pass band or to change the shape of the pass band. The impedance of network circuitry may be useful to determine where there are impedance mismatches such that power losses may occur, and where network signal reflections may be occurring. This may be advantageous as reflection of network signals may cause distortion or inter-symbol interference of network communication.

Figure 2:
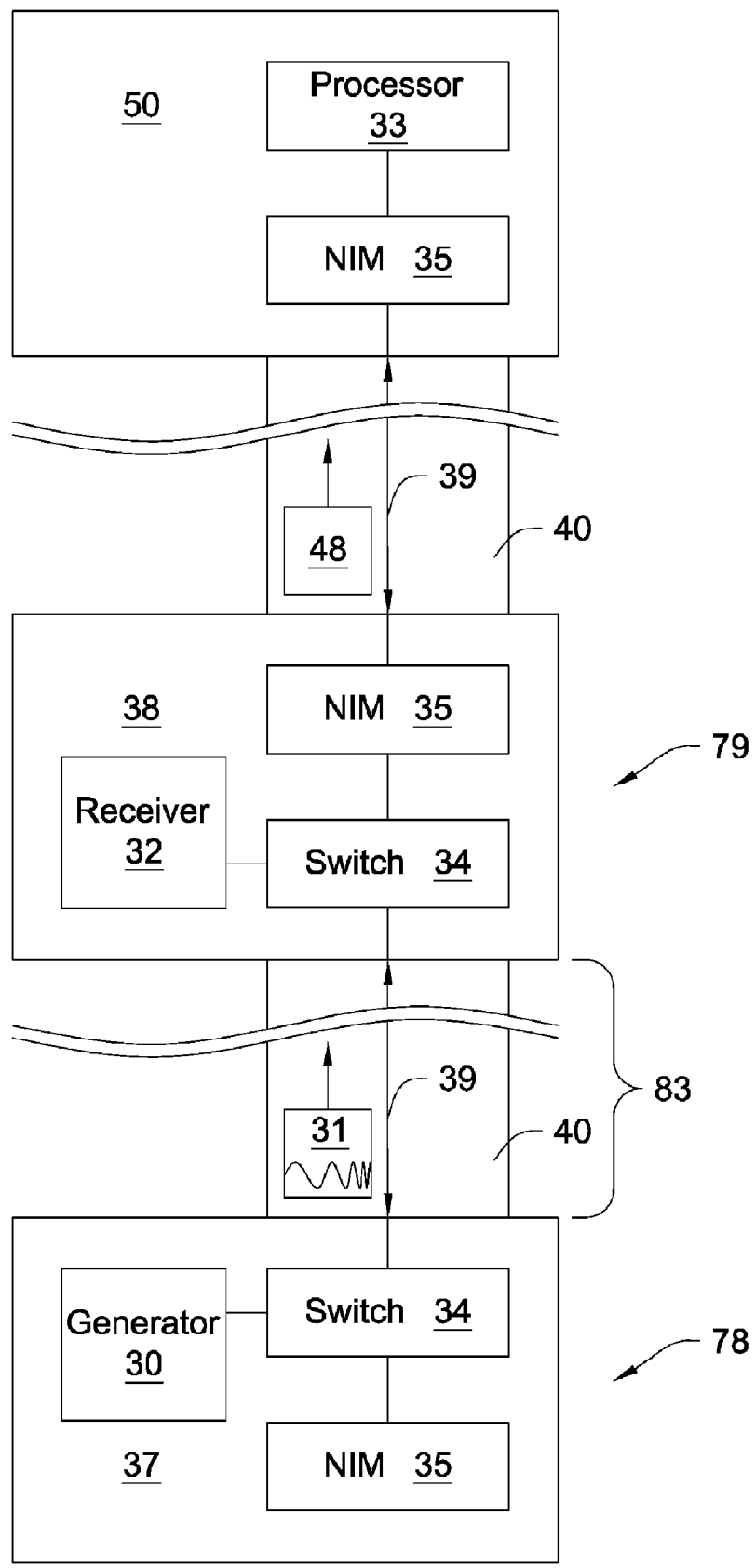
FIG. 2 is a block diagram of a system for testing properties of an electromagnetic network comprising a facilitator.

FIG. 2 shows an embodiment of a system for testing properties of an electromagnetic network 39 in a segmented downhole tool string 40. A transmitter 37 may comprise a signal generator 30 for transmitting a varying analog signal 31 along an electromagnetic network 39. The transmitter 37 may further comprise a switch 34, and a network interface modem (NIM) 35. The switch may be used to switch between the functions of testing the properties of the network 39 and communicating via the network 39. The NIM 35 may be used for communicating via the network 39.

A receiver 38 may be uphole relative to the transmitter 37, and may comprise a signal receiver 32 for receiving the varying analog signal 31. The receiver 38 may further comprise a switch 34, and a NIM 35. The transmitter 37 and the receiver 38 may be selected from the group consisting of network nodes, spectrum analyzers, repeaters, tools, drilling assemblies, computers, and surface equipment.

The receiver 38 may also be in communication with a facilitator 50 via the network 39. Data 48 representing the varying analog signal 31 may be sent to the facilitator 50. The facilitator 50 may comprise a NIM 35 and a processor 33 for facilitating determination of the differences between the transmitted varying analog signal 31 and the received signal. The differences between the transmitted varying analog signal 31 and the received signal may help determine the properties of the network 39. The facilitator 50 may be a computer. Alternatively, the facilitator 50 may be a network node, a tool, a drilling assembly, or surface equipment. A facilitator may comprise a computer program or algorithm which may determine the differences between the transmitted varying analog signal 31 and the received signal and compute the properties of the network. Alternatively, a facilitator may comprise electronic components or circuit elements such as an FPGA or integrated circuits which may perform the necessary computations. A spectrum analyzer, which is commonly known in the art, may also be used as a facilitator to receive the signal 31 and perform the computations. An apparatus which comprises such computer programs, algorithms, electronic components or circuit elements for performing the computations to determine differences between the transmitted varying analog signal 31 and the received signal and the properties of the network may be considered a facilitator. It may be difficult to have the capability of computing the properties downhole, and it may be desirable to send the data 48 to a facilitator 50 to perform the computations on large quantities of data 48. The facilitator 50 may perform some or all of the computations or analysis necessary to compute the properties of the network 39. An analysis of a property of the entire network may be desired, and each receiver 38 may determine the properties of the portion of the network 39 through which the varying analog signal 31 was transmitted. Data 48 may then be collected from a number of receivers 38, and the facilitator 50 may compare the data 48 to find correlations.

Figure 3:
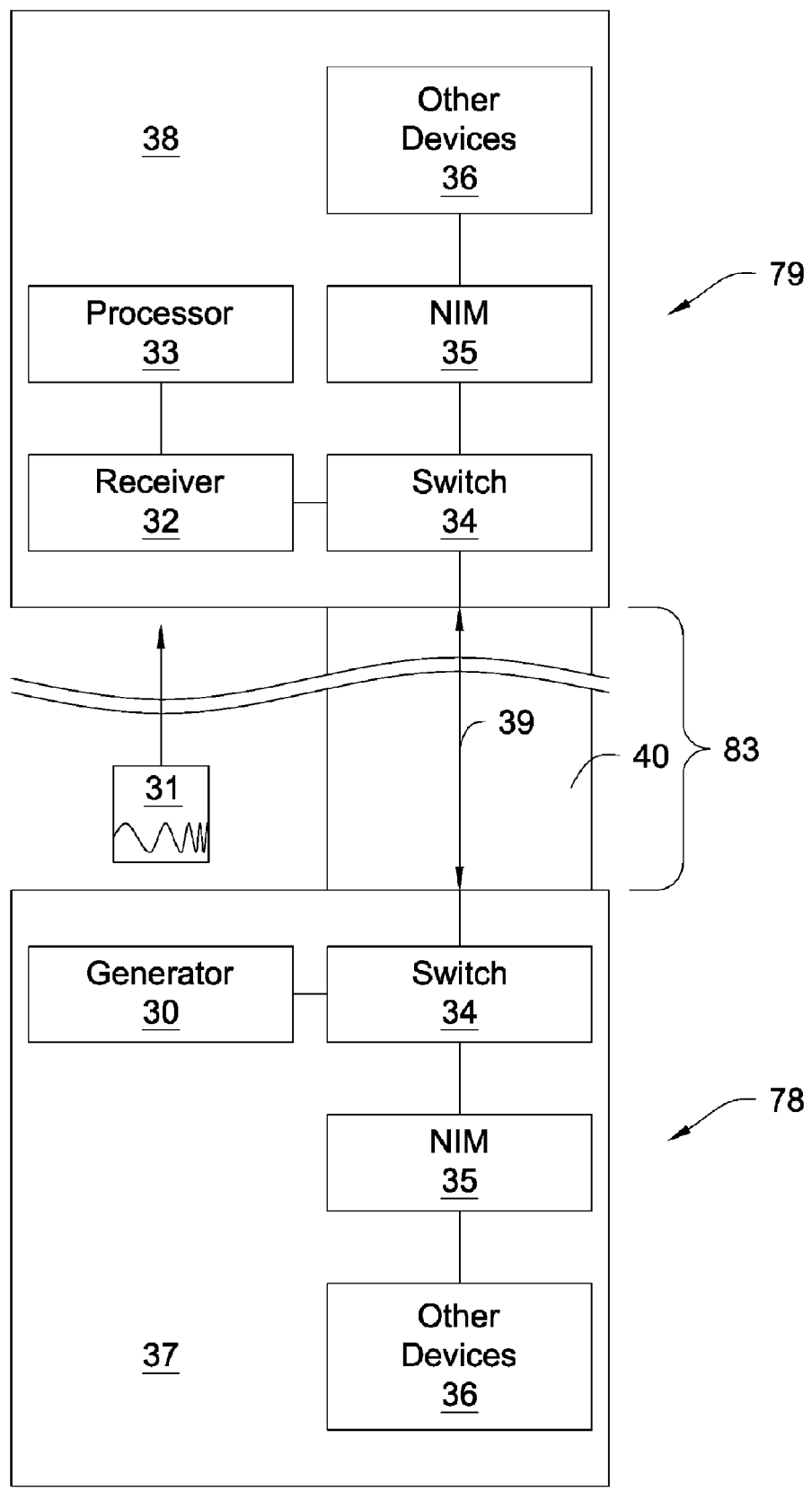
FIG. 3 is a block diagram of a system for testing properties of an electromagnetic network comprising only a transmitter and a receiver.

FIG. 3 shows functional block diagram of an embodiment of a system for testing properties of an electromagnetic network 39 integrated into a tool string 40. A first location 78 may be a transmitter 37 which may comprise a signal generator 30 for transmitting a varying analog signal 31 along a network 39, a switch 34 for switching between the functions of testing the network 39 and communicating via the network 39, a NIM 35, and other devices 36. A switch 34 may be necessary as the varying analog signal 31 may violate network protocol, and may not be transmittable through a NIM 35. Alternatively, the signal generator 30 may be always connected to the network 39, and the transmitter 37 may simply govern when the signal generator 30 operates. The other devices 36 may be a router, local node circuitry, a tool port, or data acquisition devices. The second location 79 may be a receiver 38 which may comprise a signal receiver 32 for receiving the varying analog signal 31, a switch 34 for switching between the functions of testing the network 39 and communicating via the network 39, a NIM 35, and other devices 36. The receiver 38 may further comprise a processor 33 for computing the properties of the network 39. The processor may determine the properties of the network 39 independent of a facilitator 50 as seen previously.

Figure 4:
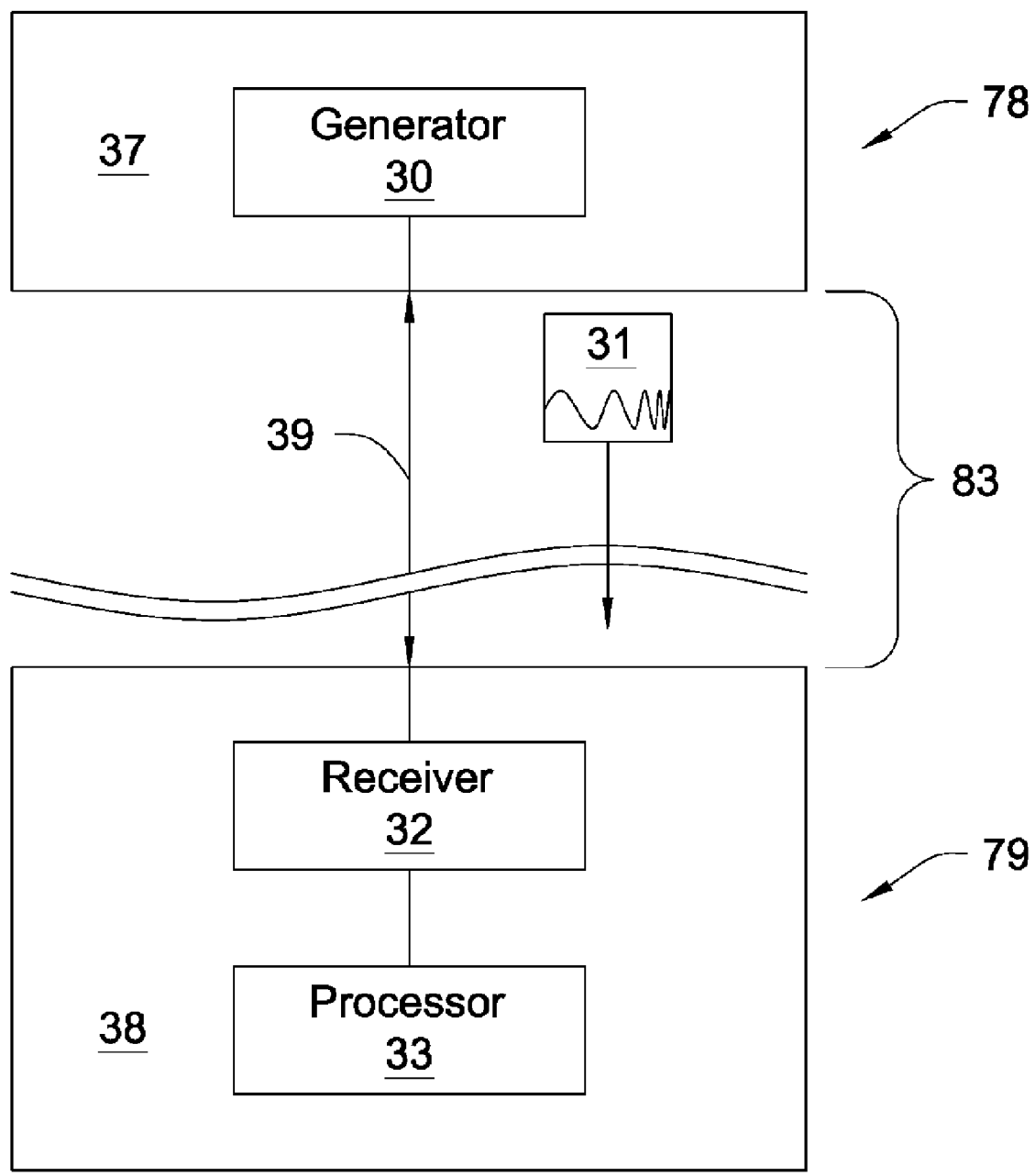
FIG. 4 is a block diagram of a system for testing properties of an electromagnetic network the first location being uphole relative to the second location.

FIG. 4 shows an embodiment of a system for testing properties of an electromagnetic network 39. A transmitter 37 may be at a first location 78 and may send a varying analog signal 31 to a receiver 38 at a second location 79 downhole relative to the transmitter 37. The receiver 38 may comprise a processor 33 for computing properties of the network 39. As the system may communicate independent of the network, the switch 34 and the NIM 35 seen previously may not be necessary. The signal generator 30 and the signal receiver 32 may be connected directly to the network 39.

Figure 5:
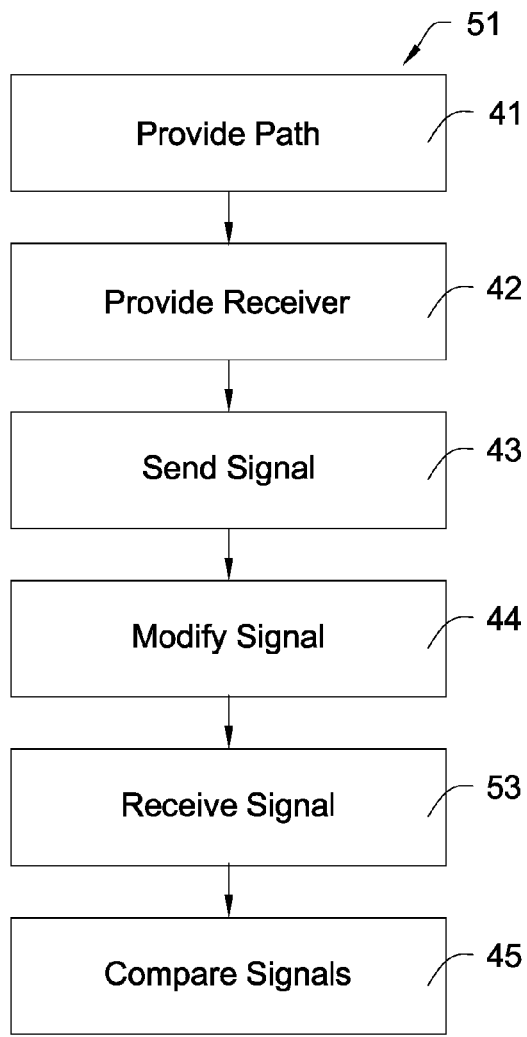
FIG. 5 is a flowchart of a method for testing properties of an electromagnetic network.

FIG. 5 shows a flowchart of an embodiment of a method 51 for testing properties of a network 39 and references FIG. 3. The method 51 comprises the step of providing 41 an electromagnetic path 83 intermediate a first location 78 and a second location 79 on the electromagnetic network 39. The first location 78 may be a transmitter 37. The first location 78 is preferably downhole relative to the second location 79. Alternatively, the first location 78 may be uphole relative to the second location 79.

The method 51 comprises the step of providing a receiver 38 at the second location 79 integrated into the electromagnetic network 39 and comprising a known reference. The receiver 38 may be disposed in a recess in a downhole tool string 40, and may not be easily moved. The known reference comprises a set amplitude, a set range of frequencies, and a set rate of change between the frequencies. For example, the known reference may be a digital representation of the analog signal 31 before transmission. The reference may have a set amplitude, a set range of frequencies, and a set rate of change between the frequencies which correspond to the analog signal 31. The known reference may be stored in memory (not shown) in the receiver 38. The known reference may alternatively be communicated digitally between the transmitter 37 and the receiver 38 over the network 39 before the signal 31 is transmitted. Typically, the range of frequencies is the range of frequencies used by the network 39. The range of frequencies may be between 0 Hz and 10 MHz. The actual range of frequencies may vary due to the sampling rate of the signal receiver 32, since the sampling rate may need to be at least twice the highest frequency in the range of frequencies. The sampling rate of the signal receiver 32 may be increased by providing faster hardware which may sample the signal 31 at a faster rate. The range of frequencies may alternatively be selected 0 Hz and 50 Mhz, and such a range may provide information about the properties of the network 39 for higher frequencies. In other embodiments the range of frequencies may be between 0 Hz and 100 MHz.

The method 51 also comprises the steps of sending 43 the analog signal from the first location 78 through the electromagnetic path 83 and modifying 44 the varying analog signal 31. The frequency of the varying analog signal 31 may be varied by performing a frequency sweep within the range of frequencies according to the set rate of change. The signal 31 is modified passively by the properties of the electromagnetic path 83 as the varying analog signal 31 is transmitted from the first location 78 to the second location 79. The varying analog signal 31 may be transmitted by a network node, a repeater, a tool, a drilling assembly, a computer, or surface equipment. The method further comprises the step receiving 53 a modified signal at the second location 79. The varying analog signal 31 may be received by the receiver, which may be a network node, a repeater, a tool, a drilling assembly, a computer, or surface equipment.

The method 51 further comprises the step comparing 45 the known reference to the modified signal 31. The known reference may be pre-programmed or otherwise stored in the receiver 38 and may therefore be compared to the modified signal 31. The differences between the known reference and the modified signal reveal the properties of the electromagnetic path 83. The properties may be frequency response of the network 39, signal attenuation, or impedance of network circuitry. The receiver 38 may compare the signals 31. Generally, the range of frequencies and the rate of change between the frequencies is used to correlate the modified signal 31 received by the receiver 38 with the known reference. This correlation may show the frequency response of the network 39, which may be how the varying analog signal 31 is altered by the portion of the network 39 over which it travels. This correlation may be made without the use of a transmitted reference signal, as the receiving device 38 may perform a spectrum analysis, or computations such as Laplace transforms or Fourier transforms, as will be discussed shortly.

Figure 6:
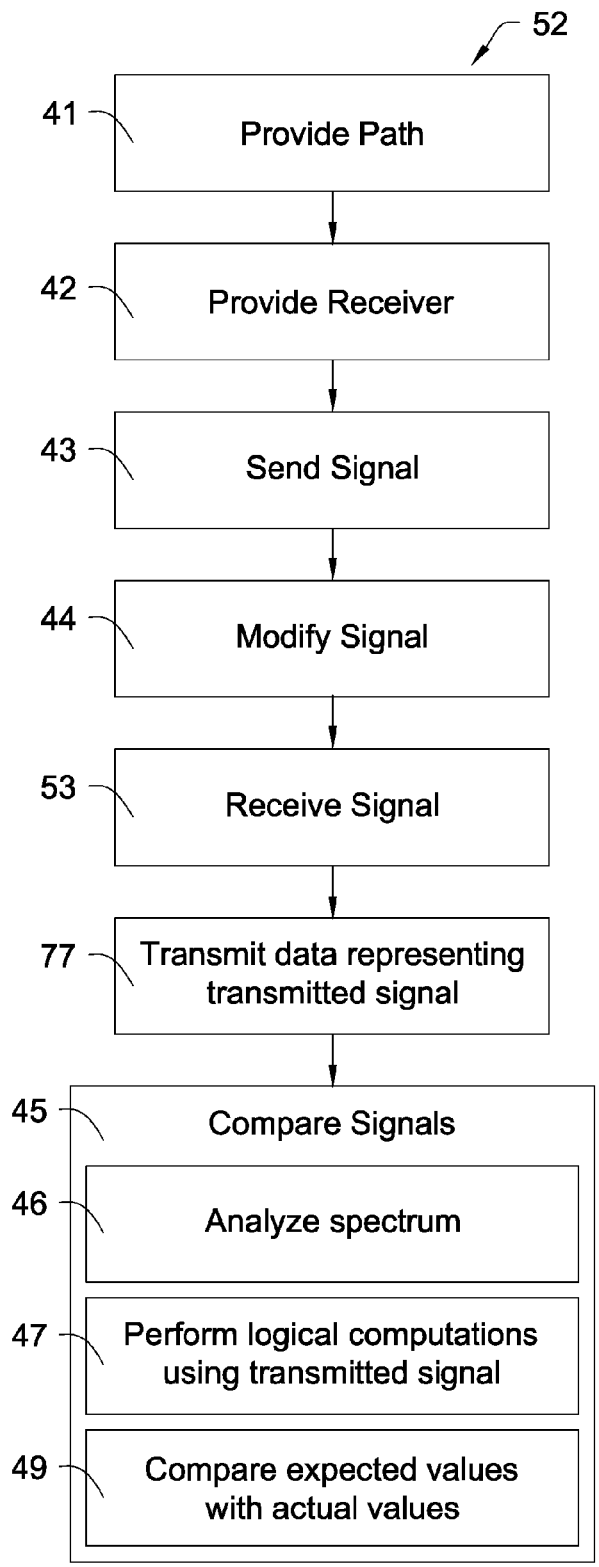
FIG. 6 is a flowchart of a more detailed method for testing properties of an electromagnetic network.

FIG. 6 shows a flowchart of an embodiment of a method 52 for testing properties of a network 39, and references FIG. 2. This method 52 comprises the steps of providing 41 an electromagnetic path 83, providing 42 a receiver 38 at the second location 79 comprising a known reference, sending 43 the analog signal 31, modifying 44 the analog signal, and receiving 53 the signal 31 as disclosed in the method 51 shown in FIG. 5 and discussed previously. This method 52 further comprises the step of transmitting 77 data 48 representing the varying analog signal 31 over the electromagnetic network 39. Typically, the data 48 is transmitted to a facilitator 50.

The method 52 also comprises the step of comparing 45 the known reference to the modified signal 31. The differences between the known reference and the modified signal reveal the properties of the electromagnetic path 83. The properties may be frequency response of the network 39, signal attenuation, or impedance of network circuitry. Preferably, the properties are computed by a facilitator 50 which may be a computer, surface equipment, or a network node. Alternatively, the receiver 38 may compute the properties of the network, as previously discussed.

The step of comparing 45 the known reference to the modified signal 31 may comprise one or more of steps 46, 47, 49. The step of analyzing 46 the spectrum of the varying analog signal 31 may show the frequency response of the network 39. The step of performing 47 logical computations using the varying analog signal 31 may include the use of Fourier transforms, Laplace transforms, or FFT's. This may show the complex impedances of the network 39, and may be used to adjust or tune the circuit to certain desired characteristics, such as a specific pass band or impedance matching. Once the complex impedances of the network 39 are known, additional circuitry may be added to adjust or tune the pass-band of the network. The step of computing 45 the properties of the network 39 may further comprise the step of comparing 49 expected values to actual values of the varying analog signal 31. An example of how expected values may be compared to actual values is that the complex impedances previously discussed may be compared to the complex impedances calculated from known parameters. A difference may indicate a short in a wire, a damaged component, or a poorly matched connection in a network.

Whereas the present invention has been described in particular relation to the drawings attached hereto, it should be understood that other and further modifications apart from those shown or suggested herein, may be made within the scope and spirit of the present invention.

What is claimed is:

1. A method for identifying properties of a downhole electromagnetic network in a downhole drill string, comprising:
    disposing a column of connected tubulars downhole to penetrate a wellbore in a subsurface formation, the tubulars forming a downhole electromagnetic network having an electromagnetic signal path therethrough, one of the tubulars comprising a first node having a sensor disposed thereon;
    sending a test signal through the electromagnetic signal path between the first node and a second node linked to the electromagnetic signal path;
    determining a property of the electromagnetic network between the first and second nodes using the test signal sent between the nodes;
    determining a downhole parameter using the sensor on the first node;
    sending a signal representative of the downhole parameter to the second node through the electromagnetic signal path; and
    adjusting a property of the electromagnetic network using the determined electromagnetic network property
    wherein the adjustable property comprising pass-band tuning, or impedance tuning property.

2. The method of claim 1, wherein determining a property of the electromagnetic network between the first and second nodes comprises comparison of the test signal against a known reference.

3. The method of claim 2, wherein the first node is downhole relative to the second node.

4. The method of claim 3, wherein the sensor is selected from the group consisting of a pressure sensor, thermocouple, temperature sensor, accelerometer, image device, seismic device, and an inclinometer.

5. The method of claim 4, wherein the downhole electromagnetic network property is selected from the group consisting of frequency response of the network, signal attenuation, and impedance of network circuitry.

6. The method of claim 4, wherein the known reference comprises a set amplitude, a set range of frequencies, or a set rate of change between frequencies.

7. The method of claim 4, wherein comparison of the test signal against the known reference comprises steps selected from the group consisting of analyzing the spectrum of the test signal, performing logical computations using the test signal, and comparing expected values to actual values.

8. The method of claim 3, wherein the test signal is compared to the known reference by a receiver at the second node.

9. The method of claim 3, wherein the test signal is compared to the known reference by a facilitator selected from the group consisting of a computer, surface equipment, and a surface network node.

10. The method of claim 2, wherein the drill string comprises a plurality of sensors distributed along the column of tubulars.

11. The method of claim 10, further comprising determining a downhole parameter at a selected sensor along the column.

12. The method of claim 11, further comprising determining a profile of the downhole parameter along the drill string.

13. The method of claim 12, wherein the plurality of sensors are selected from the group consisting of a pressure sensor, thermocouple, temperature sensor, accelerometer, image device, seismic device, and an inclinometer.

* * * * *